United States Patent

Mortensen

[15] 3,696,533
[45] Oct. 10, 1972

[54] SET OF TOY BLOCKS

[72] Inventor: Hans Mortensen, Ringerbakken 39, 2830 Virum, Denmark

[22] Filed: April 6, 1971

[21] Appl. No.: 131,726

[30] Foreign Application Priority Data

April 9, 1970  Denmark....................1792/70

[52] U.S. Cl. ....................................................35/70
[51] Int. Cl. ..............................................A63h 33/08
[58] Field of Search..............................35/69, 70, 71

[56] References Cited

UNITED STATES PATENTS

| | | | |
|---|---|---|---|
| 777,268 | 12/1904 | Thompson | 35/70 |
| 1,396,379 | 11/1921 | Moore | 35/70 |
| 2,513,596 | 7/1950 | Severson | 35/70 |
| 2,887,789 | 5/1959 | Bobo | 35/69 X |

*Primary Examiner*—Harland S. Skogquist
*Attorney*—Norman N. Holland

[57] ABSTRACT

A set of toy blocks for performing various arithmetical processes, particularly for children, comprising calculating or problem blocks, which visibly represent arithmetical problems, e.g. problems of addition or multiplication, or the individual quantities constituting the said problems, and result blocks which visibly represent the corresponding results and which are arranged for being composed with the problem blocks. The problem blocks are designed with through channels which are located in exactly the same place in all problem blocks. In the channels piston bodies are accommodated which can be displaced longitudinally by interaction with pins on or holes in the result blocks in such a way that when problem and result are in conformity, an assemblage with an unbroken surface is formed.

5 Claims, 13 Drawing Figures

SET OF TOY BLOCKS

The present invention relates to a set of toy bricks or toy blocks for carrying out various arithmetical processes, particularly for children, comprising calculating or problem blocks, which visibly represent arithmetical problems, e.g. problems of addition or multiplication, or the individual quantities constituting said problems, and result blocks which visibly represent the corresponding results and which are arranged for being composed with the problem blocks, the said problem blocks and result blocks being so arranged that they can only be composed so as to engage each other perfectly so as to form an assemblage with an unbroken surface when representing problems and results corresponding to each other.

Such toy block sets form part of the category of toys which are to serve for developing children's knowledge prior to and possibly during the first part of their school attendance in a way which does not stress or tire the children.

From U.S. Pat. No. 1,396,379 a set of toy blocks of the type referred to is known, where each of two problem blocks representing individual digits can be inserted into a space in a frame where they engage an insert, selected in advance among several inserts, inserted in this frame, the problem blocks being designed with fixed pins which engage corresponding holes in the insert, in which additional holes are provided located in a third space and having such a configuration that only a result block corresponding to the problem set by the problem blocks can be inserted into the said third space. With this set of toy blocks it is possible by the use of a sufficiently large number of problem blocks and inserts to set any optional number of problems corresponding to the number of figure combinations, but it is a disadvantage of this known set of toy blocks that a very considerably number of different inserts must be at disposal, viz. a number corresponding to the number of figure combinations, and this makes the set considerably more expensive.

In the said patent specification, reference has, however, also been made to an embodiment where the inserts have been dispensed with by such a design being used that the fixed pins on the problem blocks, e.g. addition blocks or substraction blocks, can get into direct engagement with corresponding holes in the associated result blocks. However, this design only makes possible a combination of two blocks, i.e. a calculating block, which in this case becomes a problem block, and a result block, whereas there is not, as is the case with the design mentioned above, any possibility of using two optional problem blocks for forming a problem aimed at. The fact that consequently, instead of problem blocks representing digits as in the embodiment mentioned first, problem blocks are to be used representing complete problems means that a very great number of single blocks are to be used, viz. a number of problem blocks corresponding to the number of figure combinations for each arithmetical process desired. The omission of the inserts can consequently only be achieved in connection with a corresponding use of additional single blocks.

Thus, the known set of toy blocks in both embodiments has the drawback that if a complete calculating set is to be obtained the set must comprise a very considerably number of single parts, and this entails in part an increase in the manufacturing costs, in part a considerable risk that some of the many single parts get lost, so that the set becomes incomplete. The latter risk must be stressed particularly, the toy block set being mainly intended for children.

The set of toy blocks according to the invention is characterized in that the problem blocks are made with through channels located in exactly the same place in all problem blocks and the mouths of which channels through the surface walls of the blocks have a diameter which is reduced as compared with the diameter of the channels, while in the channels piston bodies are accommodated which can be displaced longitudinally and comprise a central part fitting loosely in the channels and extending over part of the longitudinal direction of the latter, while end parts are fitted which fit loosely in the mouths of the channels and are made so as to have lengths that differ from each other in such a way that by problem blocks being combined with result blocks they interact with pins on or holes in the blocks in such way that when problem and result are in conformity an assemblage with an unbroken surface is formed.

By an engagement connection being in this way established between the blocks by means of fixed holes and displaceable pins in the form of longitudinally displaceable piston bodies, which may even have the same diameter, such a flexibility of the blocks is achieved that they are only to be at disposal in a minimum number for forming a complete set, and by this means lower manufacturing costs and fewer single parts in each toy block set as well as less risk, deriving therefrom, of certain single parts getting lost are obtained.

In this way it has been possible to provide a toy block set which is simple and consists of a minimum of single parts, but is nevertheless complete, by means of which set children, while playing with it, will in a natural way get trained in different basic arithmetical problems without having a feeling of performing some more or less onerous duties as is usually the case with ordinary lessons or homework.

The invention will in the following be explained in greater detail on the basis of some embodiment examples with reference to the drawing where.

Figure 1:
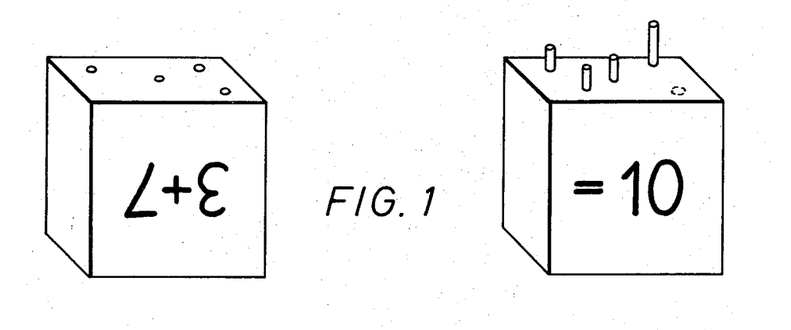
FIG. 1 shows a first embodiment of a set of toy blocks according to the invention represented by an addition block and an associated result block.

FIG. 1 shows the principle in a first embodiment of a set of toy blocks according to the invention. The problem blocks, each of which represents an arithmetical problem, in the example shown 3+7, are on one side surface made with bores which are located in such configurations or made with such depths and/or diameters that they can only be composed with a result block designed with pins into forming an assemblage with an unbroken surface, i.e. so that the side edges of the blocks are flush, by means of the result block representing the correct solution to the arithmetical problem, in the present case the result block marked with the FIG. 10.

In the embodiment example shown in FIG. 1 there are on each result block five positions for the fitting of a pin. These five positions have the same location on each block, and in the example shown, a long pin, three short pins and a blind or dummy pin have been designed in the five positions. The blind pin has been indicated dotted, having the length nil, and it may be found in any one of the five positions. The long pin may also be present in any one of the pin positions shown, and in this way a set of toy blocks is obtained which, designed in the way shown in FIG. 1, offers the possibility of 20 different result blocks, which is sufficient for a set comprising the total number of additions of the digits 1–9, only 17 result blocks being required for this purpose.

Figure 2:
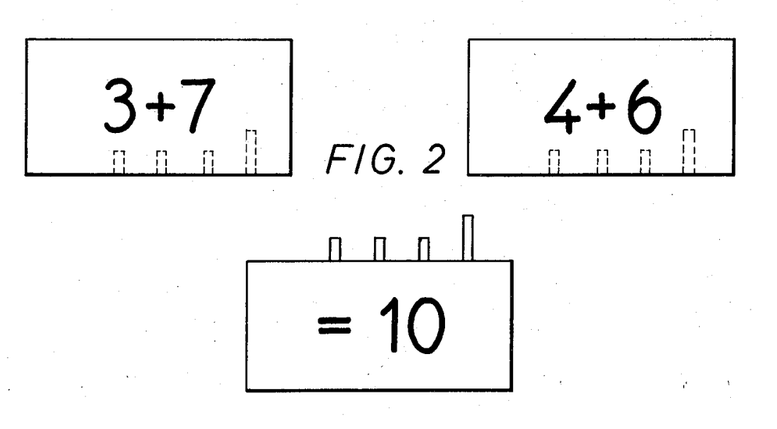
FIG. 2 shows a variant of the embodiment shown in FIG. 1.

It is also possible to achieve the number of variations of the result blocks by varying the thickness of the pins or by varying the location of the pins beyond the five fixed positions mentioned, e.g., as shown in FIG. 2, by designing three short and a long pin in a row on each result block. The number of variation possibilities can then be increased by varying the location of the pin rows, e.g. in such a way that the pin rows are placed parallel to the front of the result block, but at different distances from the edge of the front. In this case, blind pins are not required. Certainly, it will in this case be possible to combine problem blocks with result blocks representing wrong results, but in such a case the two blocks will not lie flush.

Both in the example shown in FIG. 1 and that shown in FIG. 2, problem blocks, the problems of which have one and the same result, are designed so as to be uniform and corresponding to the particular result block.

A toy block set for performing subtractions may be designed according to the same principle as the sets illustrated in FIGS. 1 and 2.

Figure 3:
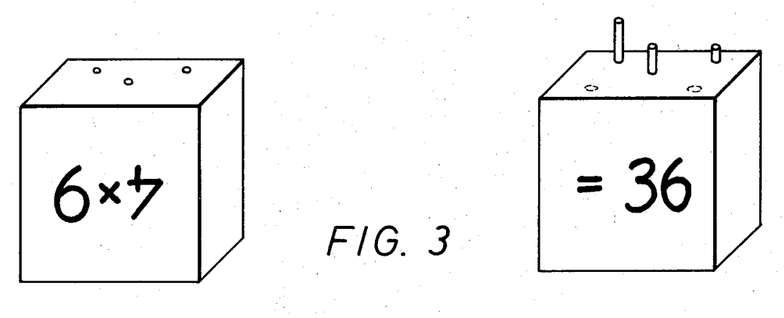
FIG. 3 shows a embodiment which in principle corresponds to that shown in FIG. 1, but which is intended for performing multiplications.
Figure 4:
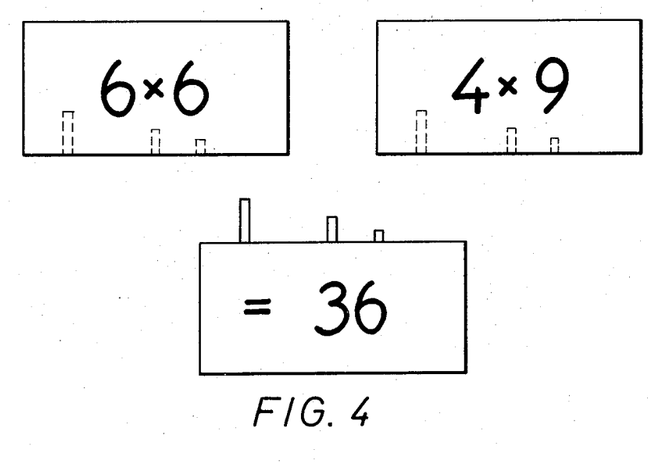
FIG. 4 shows an embodiment which is likewise intended for performing multiplications and in principle corresponds to that shown in FIG. 2.

Multiplication blocks may also be constructed by means of fixed pins and bores, and examples of such blocks are shown in FIGS. 3 and 4. Due to the greater number of results, a greater number of possibilities of variation are, however, required here, and this is in the example shown in FIG. 3 achieved by each result block comprising a long, a half-length and a short pin, while in addition to this two blind pins are provided which are again shown dotted. FIG. 4 shows an embodiment where, as is the case in FIG. 2, the pins are placed in rows and where an increase in the number of variations can be achieved by varying the location of the pin rows on the result blocks. Problem blocks, the problems of which lead to one and the same result, are also in this case designed so as to be uniform and corresponding to the particular result block.

Figure 5:
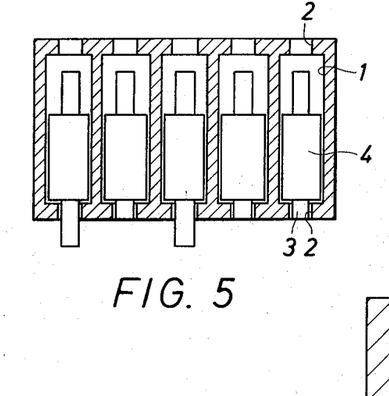
FIG. 5 shows a section in an addition block incorporated in another embodiment of a set of toy blocks according to the invention.
Figure 6:
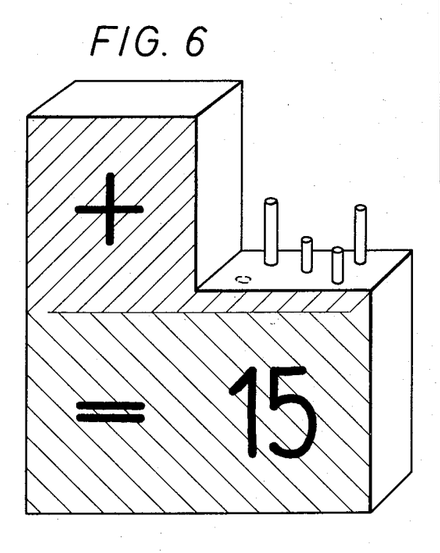
FIG. 6 shows the result block associated with the addition block shown in FIG. 5.
Figure 7:
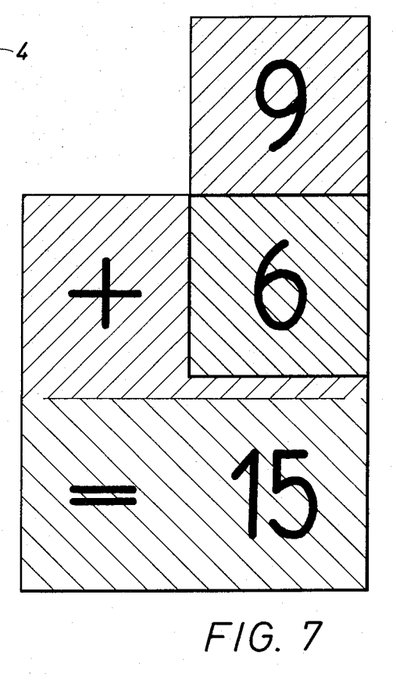
FIG. 7 shows a combination of two addition blocks as shown in FIG. 5 with a result block as shown in FIG. 6.

FIGS. 5–7 show another embodiment of a set of toy blocks according to the invention where each problem block represents a digit, such as an addend or a factor, included in an arithmetical process, e.g. an addition or a multiplication. The problem blocks, of which FIG. 5 shows an example, are here designed with through channels 1 having a narrowed cross section at their mouths on the upper side and on the underside of a block. In each of the channels 1 there has in a displaceable way been accommodated a piston body 4 with end parts 3 which can pass through the narrowed mouth parts 2 of the channels and which in the example shown are made with two different lengths, so that in their position of rest they either project out through the mouth of the channel on the underside of the block or lie flush with the surface of the block at the mouth of the channel.

Since, as mentioned above, each problem block represents a digit included in an arithmetical problem, a set of toy blocks, which is to make possible the addition or multiplication of the total number of digits between 1 and 9, subsidiarily between 2 and 9, must comprise 18 or 16 problem blocks, respectively.

FIG. 6 shows an example of a result block intended for interacting with problem blocks like those shown in FIG. 5. The result block shown is intended for addition, but a result block intended for multiplication or some other arithmetical process is designed in a way that in principle corresponds thereto. As shown in FIG. 6, each result block has four pins of uniform diameters, but of different lengths, while for attaining a suitable number of possibilities of variation one or more blind pins may be provided, a single one of which is shown dotted. The lengths of the pins on the result blocks and the lengths of the end parts 3 of the piston bodies 4 in the channels 1 of the blocks are so adapted to each other that, if two problem blocks are combined with the correct result block, an assemblage will be obtained having an unbroken surface, i.e. an assemblage where the blocks lie flush as shown in FIG. 7 and where the total number of channel mouths on the surfaces of the blocks are closed by the piston end parts 3 without the latter projecting outside the mouths.

The connection between problem blocks and result blocks is, however, in the case of this design not unambiguous, as for example the problem blocks 7+8 and the problem blocks 9+6 will not fit together with the same result block 15. For results, which may be arrived at by different additions, there must be several different result blocks at disposal, and to achieve an unambiguous connection between these and the problem blocks a special distinctive marking of the blocks must be performed, which may expediently be performed by coloring the latter. In the embodiment example shown in FIGS. 5–7 the problem blocks are colored, which has been illustrated by means of different hatchings in the drawing, so that a certain color corresponds to a certain figure. Each of the result blocks is colored in a way that is also shown by means of different hatchings, so that to an optional problem formed by two addition blocks there will be a result block indicating the correct result and having the very color or color combination to be found on the addition blocks. The coloring of the addition blocks and of the result blocks thus constitutes a guide for the unambiguous solution of a problem set. In a set of toy blocks like that described here, which is to make possible the addition of the total number of digits between 1 and 9, there should consequently be 45 result blocks at disposal, while a corresponding multiplication set for multiplying the digits 2–9 must comprise 36 result blocks.

In a practical embodiment of a set of calculating blocks for the addition of the digits 1–9, this may be achieved by dimensioning problem blocks and result blocks in the way indicated in the table shown below, a piston body, which in its position of rest projects out through the channel mouth as shown by the piston body to the left in FIG. 5, being designated by "1", while a piston body, which in its position of rest does not project out through the channel mouth, but lies flush with the surface of the block as shown by the piston body to the right in FIG. 5, is designated by "0", and problem blocks representing equal digits being designed so as to be uniform. The problem or addition blocks are provided with following piston bodies:

```
1 = 1 1 0 1 0     4 = 0 1 0 1 0     7 = 1 1 0 0 1
2 = 0 0 1 0 0     5 = 1 0 1 0 1     8 = 0 0 1 1 1
3 = 1 0 0 1 0     6 = 0 0 0 0 1     9 = 1 0 0 1 1
```

For a set of twice nine problem blocks thus designed, the following result blocks can be used:

```
00202   02020   11110   12021   21101
00211   02110   11111   12100   21112
00220   02111   11112   12101   21211
01111   02200   11121   12111   22000
01120   02201   11201   12112   22011
01201   02202   11202   12120   22022
01202   10202   11211   12210   22110
01210   10211   11220   12211   22121
01211   11101   12010   20202   22220
```

The result blocks are here characterized by the length of their pins, the figure "0" indicating that in this place there is no pin or that a blind pin is provided, while the figure "1" indicates that in this place there is a pin of the same length as the outwardly projecting part of the piston body, and the figure "2" indicates that in the particular place there is a pin having a length corresponding to twice the length of an outwardly projecting piston end part.

In a practical embodiment of a toy block set according to the invention for carrying out multiplications of the digits 2–9, for which purpose, as mentioned above, 16 problem or multiplication blocks are required, the problem blocks may be provided with the following piston bodies:

```
2 = 0 0 1 0 0     5 = 1 0 1 0 1     8 = 0 0 1 1 1
3 = 1 0 0 1 0     6 = 0 0 0 0 1     9 = 1 0 0 1 1
4 = 0 1 0 1 0     7 = 1 1 0 0 1
``` while the result blocks, of which, as mentioned above, 36 are required, may be designed in the following way:

```
00220   02111   11111   12021   12210   22000
01120   02200   11121   12100   12211   22011
01210   02201   11201   12101   20202   22022
01211   02202   11202   12111   21101   22110
02020   10211   11220   12112   21112   22121
02110   11110   12010   12120   21211   22220
``` these tables characterizing the problem blocks and the result blocks in the same way as in the above tables applying to the addition blocks.

Besides providing the problem blocks with a distinct color for each figure it is also possible to give the total number of blocks in a problem block set, comprising the digits 1–9, one and the same color, while the problem blocks in the other set of problem blocks get another color, and the result blocks get both of the two colors. All additions should then be performed with a block from each set of problem blocks. Such a construction is somewhat cheaper to produce, but the connection between problem blocks and result blocks is not unambiguous unless the blocks are provided with additional distinct markings.

Figure 8:
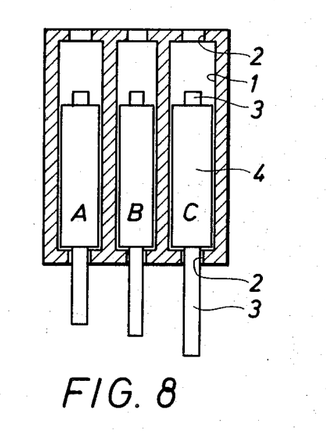
FIG. 8 shows a section in an addition block incorporated in a third embodiment of a set of toy blocks according to the invention.
Figure 9:
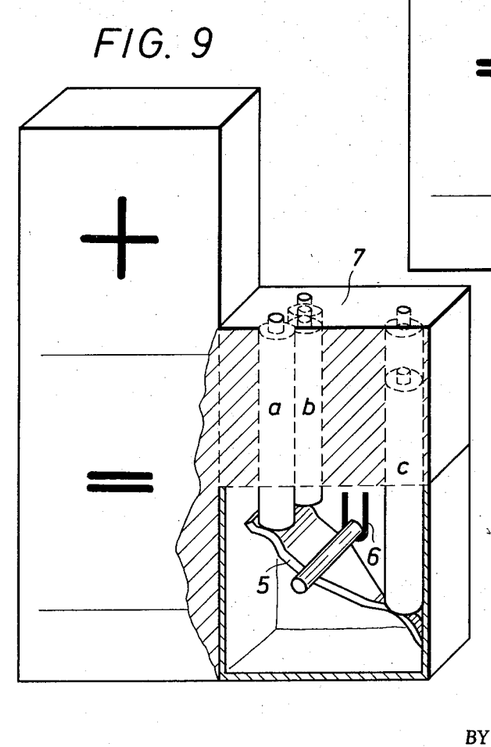
FIG. 9 shows the result block associated with the addition block shown in FIG. 8, FIG. 10 a combination of two addition blocks as shown in FIG. 8 with a result block as shown in FIG. 9.
Figure 10:
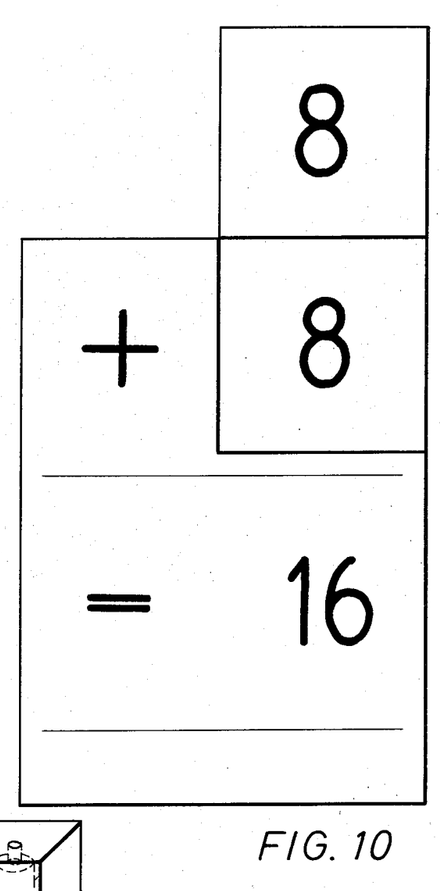

FIGS. 8–10 show an embodiment of a set of toy blocks according to the invention for performing additions, where each problem block represents a digit as is the case with the embodiment shown in FIGS. 5–7, but where the problem blocks and result blocks intended for addition are of the same color.

The problem blocks, of which FIG. 8 shows an example, are in principle designed in a way similar to that shown in FIG. 5, but they comprise only three piston bodies A, B and C which are accommodated displaceably in channels 1 in the blocks and which have end parts 3 which can pass through the narrowed mouth parts 2 of the channels 1, and which may have five different lengths.

To interact with these problem blocks, this embodiment of the toy block set comprises result blocks like that shown in FIG. 9. The result block shown is on the surface 7, on which the problem blocks are to be placed, provided with three apertures through which end parts 3 projecting out from the undersides of the problem blocks can penetrate into the interior of the result block, where they can engage a double-armed rocking member 5, suspended pivotably at 6, via additional piston bodies a, b and c, so that the piston bodies A or B in a problem block via the additional piston bodies a and b actuate the rocking member 5 counterclockwise, while the piston body C in the problem block via the additional piston body c actuates the rocking member 5 clockwise.

The rocking member 5 is exactly the same in all of the result blocks included in a set of toy blocks, and in the present example it is journalled in such a way that the arm actuated by the piston body c is three times as long as the arm actuated by the piston bodies a and b, so that if the piston bodies a or b are lowered one unit of length, the piston body c is raised three units of length.

The lengths of the end parts 3 on the piston bodies A, B and C in the problem blocks, which project out on the undersides of the problem blocks, and the lengths of the additional piston bodies a, b and c in the result blocks are adapted to each other in such a way that the combination of two problem blocks for forming an addition problem can only be combined with a result block into forming an assemblage with an unbroken surface, i.e. an assemblage like that shown in FIG. 10, where the blocks lie flush with each other and where all of the three apertures in the uppermost problem block are closed by the uppermost end parts 3 on the piston bodies A, B and C, by means of a result block representing the correct result, in the present case the result block showing the result 16.

This effect is connected with the fact that the effect on each other of the piston bodies A, B and C and the piston bodies a, b and c with the assistance of the rocking member 5 will only by a composition of associated problem blocks and result blocks cause a closing of all of the three apertures in the uppermost surface of the uppermost problem block in FIG. 10, whereas, if a combination of two problem blocks is composed with a result block representing an incorrect result, the piston bodies will either influence each other in such a way that one or more of the uppermost end parts of the piston bodies in the uppermost problem block do not close their openings or have such an effect on each other that the two problem blocks and the result block cannot be composed so as to get into complete engagement. This is in the embodiment example shown due to the face that the rocking member 5, the position of which is determined by the piston bodies B and C, in the said case will take up such a position that the piston body A in the uppermost problem block in the first case will not be displaced d sufficiently for closing the mouth of the associated channel 1 and in the second case is pressed against the uppermost narrowed mouth part of the associated channel, before the blocks have been made to engage completely, and thereby prevents the complete assemblage of the blocks.

While the piston bodies B and C thus solely serve for determining the position of the rocking member 5, the piston body A — together with the piston body C — serves for additionally characterizing a certain block, so that the necessary number of possibilities of variation can be obtained.

This implies that the lengths of the outwardly projecting parts of the end parts of the piston bodies B and C have to vary in opposite senses and in conformity with the ratio given by the ration between the lengths of the arms of the rocking member 5, in the present case the ratio 1 : 3, as will also appear from the following table, The rocking member 5 will then when two problem blocks are composed with a result block always be able to take up a position in which it is in contact with both piston bodies $b$ and $c$, so that the latter displace the piston bodies B and C in the problem block for the closing of the associated channel mouths without actuating the rocking member 5 for bending, but the piston bodies A ensure that the rocking member can only be in such a corresponding contact with the piston body $a$, if the result block represents the correct result of the problem set by means of the problem blocks. If this is not the case, the piston body A in the uppermost of the problem blocks will either be unable to close the associated aperture in the particular problem block, or this piston body will, while actuating the rocking member 5 for bending, prevent a complete assemblage of the blocks as described above.

The bending stress just mentioned on the rocking member 5 may lead to breakage of the latter if the blocks in the case of discrepancy between problem and result are in an attempt to assemble them completely subjected to undue force. To avoid this, it is possible to design the uppermost end parts of the piston bodies A in the problem blocks in the way shown dotted in FIG. 8. The end parts of the piston bodies 3 can then pass through the narrowed mouth parts of the associated channels 1, and two problem blocks and a corresponding result block will then always be capable of being assembled completely, but the surface of the assemblage will only be unbroken in the case of conformity between problem and result. Otherwise, the end part of the piston body A will either be incapable of closing the mouth of the associated channel, or it will project some distance out through this mouth, so that the error can also in this case be ascertained immediately.

The interaction described between problem blocks and result blocks may be achieved with the lengths, given in the table below, of those parts of the end parts of the piston bodies A, B and C, which parts in the position of rest project down under the lowest surface of the problem blocks, the FIGS. 2, 2 ⅓, ⅔ 2/3 etc. referring to units of length, which in the drawing amount to 7 mm:

| Addend | A | B | C |
|--------|---|------|---|
| 1 | 2 | 2 2/3 | 2 |
| 2 | 2 | 2 1/3 | 3 |
| 3 | 2 2 | | 4 |
| 4 | 3 | 2 ⅔ | 2 |
| 5 | 3 | 2 ⅓ | 3 |
| 6 | 3 | 2 | 4 |
| 7 | 4 | 2 ⅔ | 2 |
| 8 | 4 | 2 ⅓ | 3 |
| 9 | 4 | 2 | 4 |

The associated piston bodies a, b and c in the result blocks may then have the following lengths, which are likewise expressed by the units of length mentioned above:

| Result | Units of length | | |
|--------|---|-----|---|
|        | a | b   | c |
| 2  | 8 | 6⅔ | 6 |
| 3  | 8 | 7  | 5 |
| 4  | 7 | 6⅓ | 7 |
| 5  | 7 | 6⅔ | 6 |
| 6  | 7 | 7  | 5 |
| 7  | 6 | 6⅓ | 7 |
| 8  | 6 | 6⅔ | 6 |
| 9  | 6 | 7  | 5 |
| 10 | 5 | 6⅓ | 7 |
| 11 | 5 | 6⅔ | 6 |
| 12 | 5 | 7  | 5 |
| 13 | 4 | 6⅓ | 7 |
| 14 | 4 | 6⅔ | 6 |
| 15 | 4 | 7  | 5 |
| 16 | 3 | 6⅓ | 7 |
| 17 | 3 | 6⅔ | 6 |
| 18 | 3 | 7  | 5 |

The distances between the surface 7 of the result blocks and the lowest end surfaces of the piston bodies $a$, $b$ and $c$ are 7, 7, and 9 units of length, respectively, when the body c is in the lowest position and the bodies a and b in the uppermost position, while these distances amount to 8, 8 and 6 units of length, respectively, when the body $c$ is in the uppermost position and the bodies $a$ and $b$ are in the lowest position.

Figures 11, 12, 13:
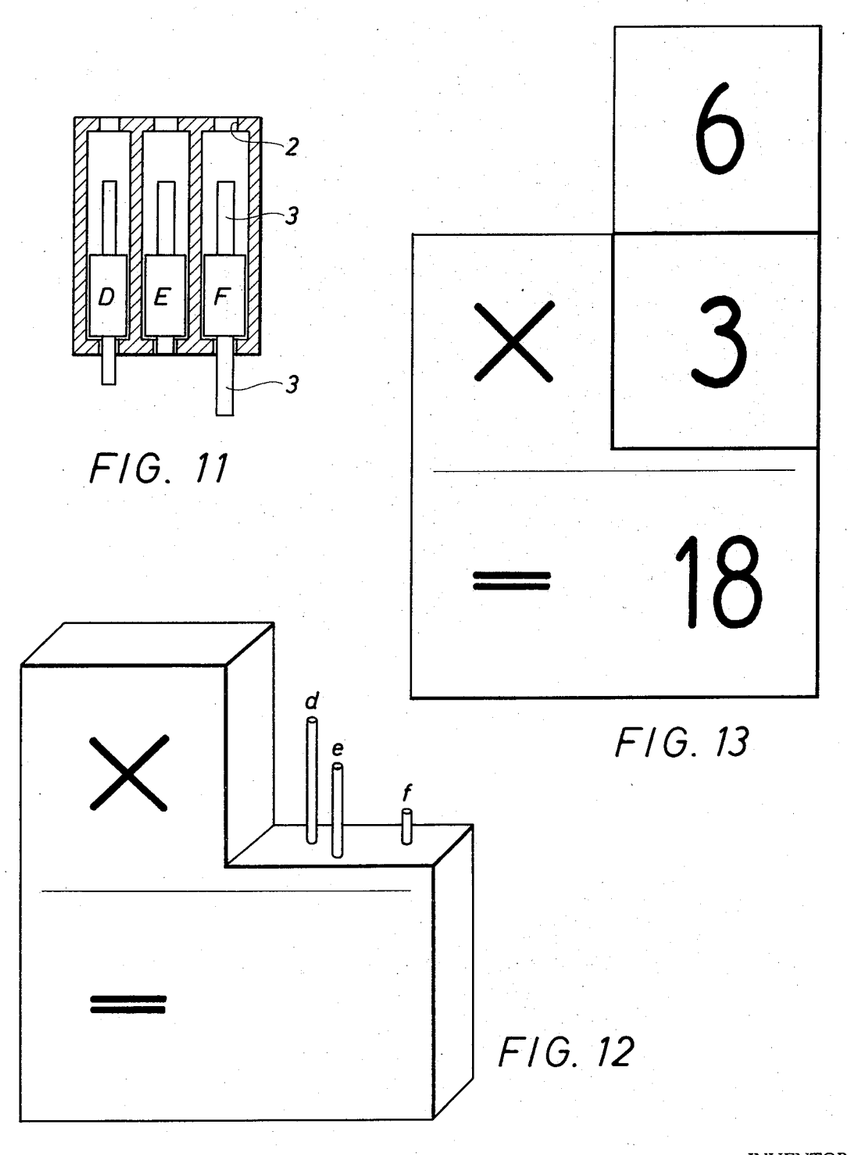
FIG. 11 shows a section in a multiplication block corresponding in principle to the addition block shown in FIG. 8.
FIG. 12 shows a result block corresponding to the multiplication block shown in FIG. 11
FIG. 13 shows a combination of two multiplication blocks as shown in FIG. 11 with a result block as shown in FIG. 12.

FIGS. 11–13 show an embodiment of the toy block set according to the invention, with which multiplication of the digits 2–9 can be performed by means of problem blocks and result blocks of the same color.

The problem blocks, of which FIG. 11 shows an example, are designed in a similar way as the problem blocks of the same color for addition shown in FIG. 8, and the end parts, projecting through the lowest surfaces of the problem blocks, of the piston bodies D, E and F have three different lengths. These end parts on the piston bodies are arranged for interacting with pins on the result blocks, which pins are on the result block, shown as an example in FIG. 12, designated by $d$, $e$ and $f$. The pins may have a total of four different lengths, but they may also serve as blind pins, which means that they have the length 0.

If two problem blocks, e.g. the blocks "3" and "6" are combined with each other for forming a multiplication problem and are next combined with the correct result block, in this case the block "18", an assemblage with an unbroken surface will be produced as shown in FIG. 13, since the pins $d$, $e$ and $f$ will displace the piston bodies in such a way that the apertures in the uppermost problem block are exactly closed by the uppermost end parts 3 of the piston bodies.

This may be achieved by means of problem blocks where the end parts 3 of the piston bodies D, E and F projecting out in the position of rest have the following lengths expressed in units of length which in the drawing amount to 7 mm:

```
2 = 020      5 = 010           8 = 200
3 = 021      6 = 111           9 = 112
4 = 110                7 = 220
```

The pins on the associated result blocks then have the lengths likewise expressed in units of lengths of 7 mm in the drawing:

| Result | Result block | Complementary figure | Corresponding to the problems |
|---|---|---|---|
| 49 | 004 | 440 | 7 × 7 |
| 56 | 024 |  | 7 20 8 |
| 64 | 044 | 400 | 8 × 8 |
| 63 | 112 | 332 | 7 × 9 |
| 42 | 113 | 331 | 6 × 7 |
| 28 | 114 | 330 | 4 × 7 |
| 72 | 132 | 312 | 8 × 9 |
| 48 | 133 | 311 | 6 × 8 |
| 32 | 134 | 310 | 3 × 7 |
| 21 | 203 | 241 | 3 × 7 |
| 14 | 204 | 240 | 2 × 7 |
| 35 | 214 | 230 | 5 × 7 |
| 81 | 220 | 224 | 9 × 9 |
| 54 | 221 | 223 | 6 × 9 |
| 36 | 222 | 222 | 4 × 9  6 × 6 |
| 24 | 223 | 221 | 3 × 8  4 × 6 |
| 16 | 224 | 220 | 2 × 8  4 × 4 |
| 40 | 235 | 210 | 5 × 8 |
| 27 | 311 | 133 | 3 × 9 |
| 18 | 312 | 132 | 2 × 9  3 × 6 |
| 12 | 313 | 131 | 2 × 6  3 × 4 |
| 8 | 314 | 130 | 2 × 4 |
| 45 | 322 | 122 | 5 × 9 |
| 30 | 323 | 121 | 5 × 6 |
| 20 | 324 | 120 | 4 × 5 |
| 9 | 402 | 042 | 3 × 3 |
| 6 | 403 | 041 | 2 × 3 |
| 4 | 404 | 040 | 2 × 2 |
| 15 | 413 | 031 | 3 × 5 |
| 10 | 414 | 030 | 2 × 5 |
| 25 | 424 | 020 | 5 × 5 |

What is claimed is:

1. A set of toy blocks for preforming various arithmetical processes, particularly for children, comprising calculating or problem blocks, which visibly represent arithmetical problems, e.g., problems of addition or multiplication, or the individual quantities constituting the said problems, and result blocks which visibly represent the corresponding results and which are arranged for being composed with the problem blocks, the said problem blocks and result blocks being so arranged that they can only be composed so as to engage each other perfectly so as to form an assemblage with an unbroken surface when representing problems and results corresponding to each other, characterized in that the problem blocks are designed with through channels which are located in exactly the same place in all problem blocks and the mouths of which through the surface walls of the blocks have a diameter that is reduced as compared with the diameter of the channels, while in the channels piston bodies are accommodated which can be displaced longitudinally and comprise a central part, fitting loosely in he channels and extending over part of the longitudinal direction of the latter, and end parts which fit loosely in the mouths of the channels and are made so as to have lengths that differ from each other in such a way that by problem blocks being combined with result blocks they interact with pins on or holes in the blocks in such a way that when problem and result are in conformity, an assemblage with an unbroken surface is formed.

2. A set of toy blocks as claimed in claim 1, characterized in that each of the problem blocks has three piston bodies, the end parts of which can pass through corresponding apertures in the surface, intended for contact with a problem block, of a result block, so that two of the piston bodies actuate one end of a double-armed rocking member mounted in the interior of the result block, while the third piston body actuates the other end of the said rocking member, while the lengths of the end parts of the piston bodies accommodated in the problem blocks are so adapted that only problem blocks and result blocks representing problems and results corresponding to each other can be composed with each other for forming an assemblage with an unbroken surface.

3. A set of toy blocks as claimed in claim 2, characterized in that the end parts on the piston bodies in the problem blocks actuate the rocking member in the result blocks via additional piston bodies which are accommodated displaceably in the result blocks.

4. A set of toy blocks as claimed in claim 1, where each problem block represents a digit included in an arithmetical process, e.g., an addend or a factor, characterized in that the total number of problem blocks can be composed with an optional other problem block for forming an arithmetical problem, and that the combination of two problem blocks formed hereby can only be composed with a result block so as to form an assemblage with an unbroken surface by means of the result block representing the correct result of the arithmetical problem, but not by means of the result blocks representing other results.

5. A set of toy blocks as claimed in claim 4, characterized in that each of the problem blocks has its specific color corresponding to the individual digits, and that for every possible combination of two problem blocks a result block is at disposal which shows the correct result and the color or color combination corresponding to the particular problem blocks.

* * * * *